US009965531B2

(12) United States Patent
O'Kane et al.

(10) Patent No.: US 9,965,531 B2
(45) Date of Patent: May 8, 2018

(54) DATA STORAGE EXTRACT, TRANSFORM AND LOAD OPERATIONS FOR ENTITY AND TIME-BASED RECORD GENERATION

(71) Applicant: ACCENTURE GLOBAL SERVICES LIMITED, Dublin (IE)

(72) Inventors: Matthew O'Kane, London (GB); Nishant Sinha, Bangalore (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 318 days.

(21) Appl. No.: 14/842,476

(22) Filed: Sep. 1, 2015

(65) Prior Publication Data

US 2017/0024446 A1    Jan. 26, 2017

(30) Foreign Application Priority Data

Jul. 21, 2015  (IN) .............. 3739/CHE/2015

(51) Int. Cl.
*G06F 17/30*    (2006.01)

(52) U.S. Cl.
CPC .. *G06F 17/30563* (2013.01); *G06F 17/30339* (2013.01); *G06F 17/30398* (2013.01)

(58) Field of Classification Search
USPC ............ 707/607, 609, 687, 790, 813, 821
See application file for complete search history.

(56) References Cited

U.S. PATENT DOCUMENTS

| 2011/0082597 A1* | 4/2011 | Meagher | H02J 3/38 700/291 |
| 2012/0191440 A1* | 7/2012 | Meagher | H02J 3/38 703/18 |
| 2014/0132758 A1* | 5/2014 | Saptharishi | H04N 7/18 348/135 |

OTHER PUBLICATIONS

Dawnseeker200 et al: "Extract, transform, load", Wikipedia, the free encyclopedia, Jul. 15, 2015, pp. 1-9.
Rahm et al., "Data Cleaning: Problems and Current Approaches", Quarterly Bulletin of the Computer Society of the IEEE Technical Committee on Data Engineering, The Committee, Washington, DC, US, Dec. 2000, pp. 1-11.
Paulraj Ponniah: "Chapter 2: Data Warehouse: The Building Blocks" In: "Data Warehousing Fundamentals: A Comprehensive Guide for IT Professionals", 2001 John Wiley & Son, Inc., pp. 19-38.

* cited by examiner

*Primary Examiner* — Sana Al Hashemi
(74) *Attorney, Agent, or Firm* — Mannava & Kang, P.C.

(57) ABSTRACT

An extract, transform and load (ETL) data storage system performs extract, transform and load operations to load target tables with data extracted and transformed data from multiple data sources. Transformations include matching and linking date temporarily stored in intermediate tables by entity across data sources. Data may be organized by entity and time, and analytical records can be generated from the intermediate tables according to variable transforms. The analytical records may be used for predictive analytics.

20 Claims, 6 Drawing Sheets

Data Source 1

| ID | Name | Address |
|---|---|---|
| 32145 | John & Wilson Ltd. | 2 The High Street, London, SE241ET |
| 666111 | UNKNOWN | 1 Head Office |

Data Source 2

| ID2 | Company Name | Address |
|---|---|---|
| 8883433 | John and Willson | Head Office, 2 The High Street, Clapham, London, SE241ET |
| 78464 | UNKNOWN | 1 Default Office Address | cleansing and fuzzy matching applied between the two data sources

FIG. 4B

Data Source 1

| ID | Name | Address |
|---|---|---|
| 32145 | John Wilson | 2_SE241ET |
| 666111 | UNKNOWN | 1 |

Data Source 2

| ID2 | Company Name | Address |
|---|---|---|
| 8883433 | John Willson | 2_SE241ET |
| 78464 | UNKNOWN | 1 |

'John & Wilson Ltd.' matched to 'John and Willson', creating a unqiue identifier (CompID) to link the data but 'UNKNOWN' not linked as occurs too many times

FIG. 4C

Data Source 1

| ID | CompID | Name | Address |
|---|---|---|---|
| 32145 | 87897456 | John Wilson | 2_SE241ET |
| 666111 | | UNKNOWN | 1 |

Data Source 2

| ID2 | CompID | Company Name | Address |
|---|---|---|---|
| 8883433 | 87897456 | John Willson | 2_SE241ET |
| 78464 | | UNKNOWN | 1 | rows 501

| Customer ID | Event Date Time | Event Type | Enter Value |
|---|---|---|---|
| 387398 | 07/01/2015 09:12.11 | Log on | 0 |
| 387398 | 07/01/2015 09:30.11 | Purchase | 215.11 |
| 387398 | 10/01/2015 10:11.44 | Log on | 0 |
| 387398 | 10/01/2015 19:10.42 | Log on | 0 |
| 387398 | 10/01/2015 23:22.39 | Purchase | 656.11 |

Variable transforms applied to analytical record creation at last log on (10/01/2015 19:10.42)

virtual analytical record 502

| Customer ID | Logons_Last_1_Day | Logons_Last_2_Day | Logons_Last_3_Day | Logons_Last_4_Day | Logons_Last_5_Day | Purchases_Last_1_week | Purchases_Last_2_week | Purchases_Last_3_week | Purchases_Last_4_week | Late_Night_Logons_Last_1_Day | Late_Night_Logons_Last_2_Day | Late_Night_Logons_Last_3_Day |
|---|---|---|---|---|---|---|---|---|---|---|---|---|
| 387398 | 1 | 1 | 1 | 1 | 2 | 1 | 1 | 1 | 1 | 0 | 0 | 0 |

DATA STORAGE EXTRACT, TRANSFORM AND LOAD OPERATIONS FOR ENTITY AND TIME-BASED RECORD GENERATION

PRIORITY

This application claims priority to Indian Patent Application Number: 3739/CHE/2015, filed Jul. 21, 2015, entitled "Data Storage Extract, Transform And Load Operations For Entity And Time-Based Record Generation", which is incorporated by reference in its entirety.

BACKGROUND

Extract, transform and load (ETL) refers to operations for populating a database which may be used in a data warehouse. The data warehouse may provide data reporting and other data analysis functionality using the database.

In many instances, the data warehouse may be used to store massive amounts of data that may be provided by many different sources, and the data may be provided from the sources in an unstructured format or a format that is different from what can be understood by the database. The data from the data sources is loaded into the database, and the database organizes the data using various fields defined by the database administrator when the database is created. By storing the unstructured data in an organized manner in the database, queries, reporting and other data analysis functions can be performed on the data.

ETL operations can facilitate the loading of the data from many different data sources into the database by transforming the data prior to the loading.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. In some instances, well known methods and structures have not been described in detail so as not to unnecessarily obscure the embodiments.

According to embodiments, a data storage, extract, transform and load (ETL) system is operable to perform ETL operations on data from disparate data sources. The system extracts data from data sources, stores the extracted data in intermediate tables, performs transformation operations on the data to organize the data in an entity and time-based order for loading into target tables in a data warehouse and for generating entity and time-based order virtual analytical records which may be used for analytics. Entity and time-based historic data sets may be created from data in the intermediate tables, and include virtual analytical records that are generated from variable transforms.

The data storage ETL system may generate historic data sets according to an entity and time-based order for storage in the target tables. Also, the system may run predictive analytics on the historic data sets to generate prediction values that are also stored in the target tables. The data in the target tables may be exposed, for example via application program interfaces, to other systems that can use the data, including prediction values, for system-based decision processes.

Transformation operations performed by the data storage ETL system may include operations performed on the data extracted from the data sources prior to loading into the target tables. The transformation operations may be performed on the data while it is stored in intermediate tables. Intermediate tables store the extracted data before loading into the target tables. The data storage ETL system can deconstruct data from the data sources and creating new fact tables, referred to as analytics record fact tables for each data source, from fact and dimension tables from the data sources.

The transformation operations may include data matching across disparate data sources. For example, the complexity of individual fields is reduced through cleansing and by creating a concatenated field by joining multiple individual fields. The cleansed and concatenated fields are compared to identify matching rows between data sources, and the matching rows may be linked if an over-linking value is satisfied. The over-linking value may include a threshold to minimize over-linking of rows that may match on a particular field but are not related. Transformation operations, e.g., including variable transforms, may be performed on the linked rows to aggregate data for an entity according to entity, time and/or other fields. A unique identifier may be created for linked rows in the intermediate tables. Also, the intermediate tables may be sorted by the unique identifier and partitioned across clusters. This improves query response times whether the query is for creating a historic data set or another type of entity or time-based query.

The data storage ETL system may employ adaptive machine learning. For example, text mining using Latent Dirichlet Allocation and predictive modelling through random forest are performed to create additional factors in the analytics record fact tables.

The data storage ETL system can deconstruct traditional database management system (DBMS) structures, such as fact tables and dimension tables, in normalized form into entity timelines. The data storage ETL system can merge disparate data sources across a particular entity in an analytics record fact table. and create a virtual analytical record for specific timeframes within an entity timeline. A technical problem of the traditions DBMS systems is that they have difficulty in organizing data from disparate sources based on entity and time without substantial manual steps, and the traditional DBMS system may not be able to run predictive analytics on data from disparate sources and feed the data in real-time to systems that may use the extracted data and the output of the predictive analytics in real-time. This may be especially apparent when the data from the data sources include large numbers of transactions or events in short time periods, such as customer transactions, network security events, etc. The data storage ETL system may organize data according to entity and time and execute particular transformations to improve query response time to sub-second speeds and feed data into online, real-time systems that may use historic and predictive analytics data for decision making.

Figure 1:
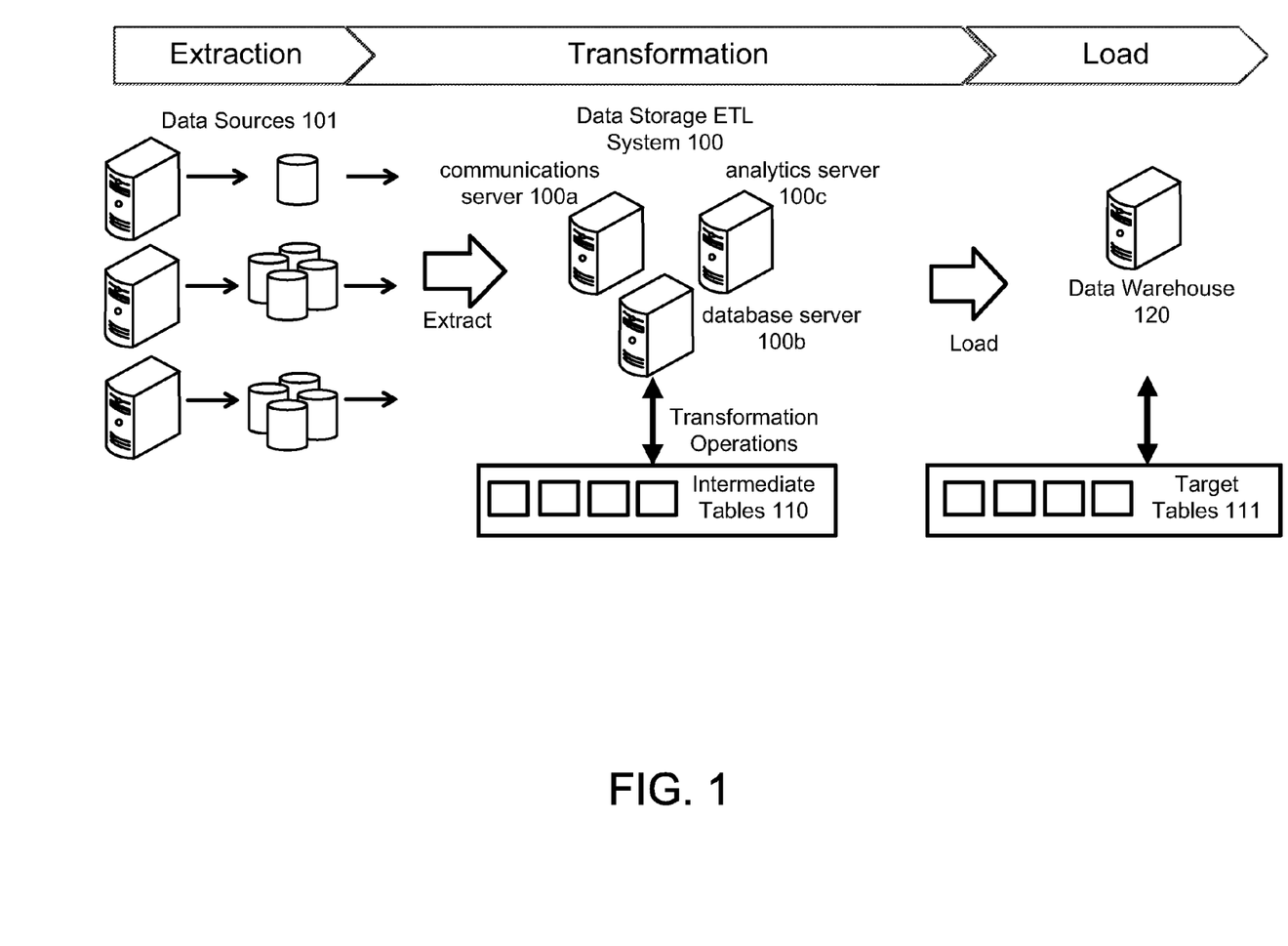
FIG. 1 illustrates a data storage ETL system, according to an embodiment.

FIG. 1 illustrates data storage ETL system 100. In an embodiment, the system 100 may include communications server 100a, database server 100b, and analytics server 100c. Each server may include one or more processors, memory and other data storage to store software applications and information, and to perform its functions. The system 100 in other embodiments may include computer systems other than servers, or the system 100 may execute applications for the servers 100a-c on a single computer system or server or multiple computer systems or servers.

The communications server 100a interfaces with the data sources 101 to extract data from the data sources 101. The communications server 100a may include a web server, a telematics server and/or another type of server that facilitates retrieving data from the data sources 101 or receiving data pushed from the data sources 101. The communications server 100a may execute any suitable communication applications to extract data from the data sources 101.

The database server 100b stores extracted data in intermediate tables 110 and performs transformation operations on the extracted data to transform the data for storage in target tables 111. The database server 100b also loads the transformed data in the target tables 111, which may be in a data warehouse 120 or another data storage system. The data warehouse 120 may include a traditional database management system, a HADOOP distributed file system, or any suitable data storage and management system.

The tables 110 are referred to as intermediate tables or staging tables because they are used for processing data from the data sources 101 before loading the data into the target database 120.

The transformation operations performed for example by the database server 100b on the extracted data may include deconstructing data structures, such as fact tables and dimension tables extracted from the data sources 101, in normalized form into entity timelines and storing the data in analytics record fact tables provided in the intermediate tables 110. Also, the data extracted from the data sources 101 is merged across a particular entity in the analytics record fact table. Data cleansing and fuzzy matching operations may be performed on the data for merging data from the data sources 101. Additionally, over-linking operations may be performed for the merging to minimize incorrect matching and linking of data for the merges. Also, the transformation operations may include generating virtual analytical records created for specific timeframes within an entity timeline. The virtual analytical records may include aggregations of fields according to aggregation rules.

The transformation operations may include creating a time-based and entity-based historic data set, including virtual analytical records, for executing predictive analytics. The analytics server 100c executes the predictive analytics to generate a prediction based on the historic data set. The prediction may be stored in the intermediate tables 110 and loaded in the target tables 111. The analytics may include machine learning techniques including but not limited to Deep Learning methods, Random Forests, Support Vector Machines, Neural Networks, Uplift Modelling, Net-Lift Modelling, Model-based Recursive Partitioning Trees and Forests, Conditional Treatment Models, Clustering Methods. For example, in customer retention models, an uplift model would be built to predict churn probability given a number of competing customer treatments and the analytics predicts the churn based on the model.

Once the transformed data is loaded in the target tables 111 in the data warehouse 120, the data in the target tables 111 may be used for real-time decision making processes performed by external systems. For example, the system 100 may include an applications programs interface (API) or another interface to allow users to create analytical records for time snapshots and generate predictions by the analytics server 100c according to the snapshots. In an example, the snapshot is for a customer currently on an online shopping website, and is used to make predictions on what the user may purchase. This information may be stored in the target tables 111 along with other extracted and transformed data, and used by an external system connected to the data warehouse 120 to provide customized treatments and product recommendations to the user. Another example includes creating a pricing model to give a real-time price for insurance to a customer shopping online.

Figure 2:
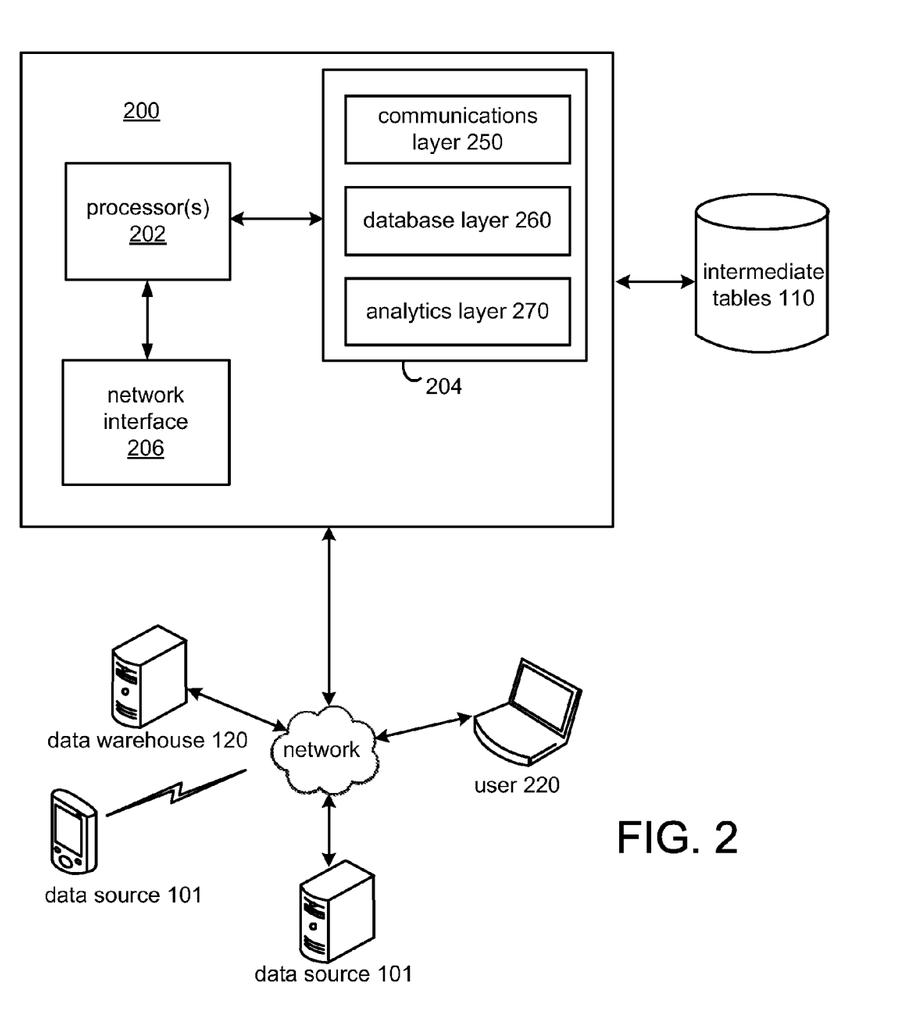
FIG. 2 illustrates a specialized computer platform for the data storage ETL system, according to an embodiment.

FIG. 2 illustrates a computer platform 200 that may be used for one or more of the servers 100a-c for the system 100. For example, the platform 200 may be a server or another computer and includes, for example, processor(s) 202, a data storage device 204, and a network interface 206. Also, the components are shown in a single computer as an example and in other examples the components may exist on multiple computers and the components may comprise multiple processors, data storage devices, interfaces, etc. For example, the components, such as layers 250-270, may be provided on respective servers 100a-c.

The data storage 204 may include a hard disk, memory, or any type of non-transitory computer readable medium. The data storage 204 may store any data used by the system 100. The processor 202 may be a microprocessor, a microcontroller, an application specific integrated circuit (ASIC), field programmable gate array (FPGA), or other type of circuit to perform various processing functions.

The data storage 204 may store machine readable instructions executed by the processor 202 to perform the operations of the system 100. The machine readable instructions may include a communications layer 250 comprised of communications applications for extracting data from the data sources 101. The communications applications may include a web server application, a portal application, telematics application, etc. The data storage 204 may store other information, such as the source-to-target mappings, validation rules, primary key and foreign key relationships, configuration information or any information used by the system 100.

The database layer 260 performs the transformation operations described herein. Additionally, the database layer 260 may include SQL server 171 or another type of database front-end to execute queries and perform other database management functions on data in the intermediate tables 110. Also, the database layer 260 performs load operations to load data from the intermediate tables 110 to the target tables 111. The analytics layer 270 include machine learning or other predictive functions for predicting values based on historic data sets generated, for example, by the database layer 260.

The network interface 206 comprises a hardware and/or a software interface. The network interface 206 for example connects the system 100 to the Internet, a local area network, etc. Also, users, such as user 220, may connect to the computer platform 200 via the network interface 206. The user 220 may provide user input including determination of missing time data, selection of entities, time periods, dimensions and variable transforms for generating the virtual analytical records, and other information. Also, data may be provided to the user 220, such as reports, entity views, etc., via the network interface 206.

Figure 3:
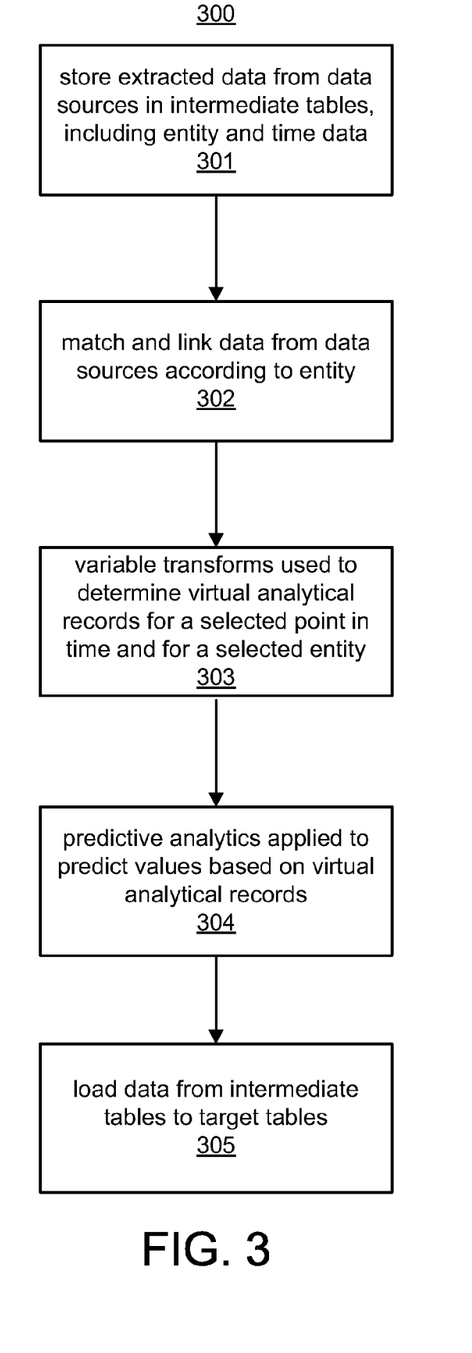
FIG. 3 illustrates a flow chart of a method including ETL operations, according to an embodiment.

FIG. 3 illustrates a flow chart of a method 300 for transforming extracted data, according to an embodiment. The extracted data may be initially stored in the intermediate tables 110. The method 300 and other methods and operations discussed herein are described by way of example as being performed by the system 100 shown in FIGS. 1 and 2, but the methods and operations may be performed by other systems. At 301, data from each of the data sources 101 is stored in the intermediate tables 110 according to time and entity fields. For example, data may be extracted from fact tables and dimension tables of the data sources 101 or flat files or from records provided in any format from the data sources 101. In one example, a specific set of data is extracted from internal and external data sources according to a defined data dictionary via extract procedures. The defined data dictionary may specify for each data source the fields and characteristics of fields to extract and store in the intermediate tables 110.

The extracted data is stored in fields in the intermediate tables 110. Entity and time fields are provided for each row of extracted data in an intermediate table. The entity field identifies an entity associated with each row. An entity may include a user identifier (ID), customer ID, etc. There may be more than one entity field in a row. The time field stores time data including a time and/or date associated with at least one other field in the row. In an example, time data may be a time of a transaction or a time an event occurred if the extracted data includes event information. For example, if the extracted data is for captured network events, time data may specify time and date of a login (e.g., a captured network event). The entity information may include the user ID of the user logging in. If time data is not provided, it may be determined or predicted from data from other sources or determined from user input information. If an entity field is not provided from the data source, another unique field may be used.

The rows of the intermediate tables 110 store the extracted data for multiple sources and include entity and time fields as discussed with respect to 301. At 302, extracted data from the data sources 101 are matched and linked according to entity and an over-linking value. Also, a unique identifier field may be created and included in the intermediate tables 110 for the linked rows.

Figure 4A:
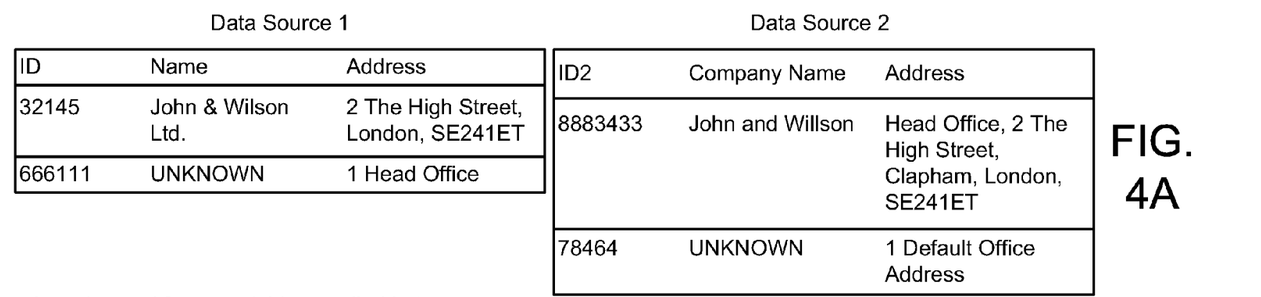
FIGS. 4A-C shows examples of transformation operations, according to an embodiment.
Figure 4B:
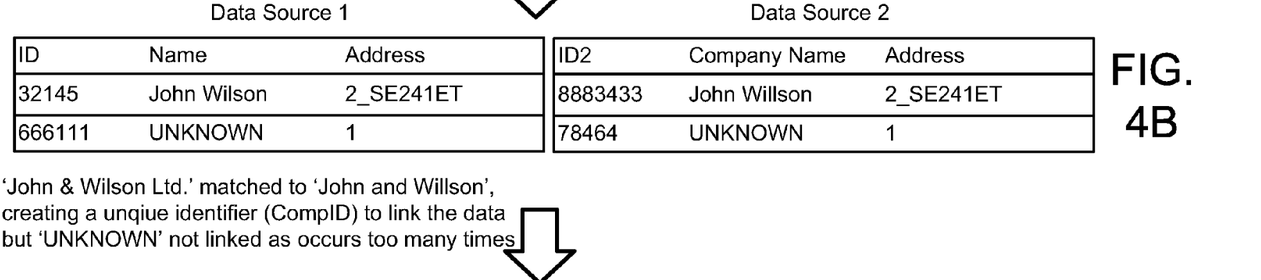
Figure 4C:
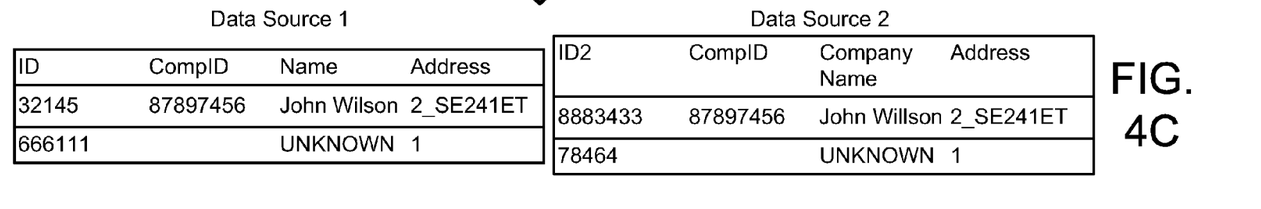

FIGS. 4A-C show examples of transformation operations that may be performed at 302. FIG. 4A shows examples of rows of extracted data from two different data sources, labeled as data sources 1 and 2. The rows may be stored in the intermediate tables 110, such as data analytics record fact tables. The rows for data source 1 include fields for ID, Name and Address, and the rows for data source 2 include fields for ID2, Company Name and Address. The fields for each data source may be determined according to a field data dictionary and data extracted for each field may be stored in the intermediate tables 110.

Cleansing and fuzzy matching may be applied to the rows of data for the data sources 1 and 2 to match the rows that are for the same entity. For example, certain fields, which may be primary or secondary keys, are cleansed and standardized with extraneous information removed. For example, for the Name field for data source 1, the "&" and "Ltd." are removed from the name "John & Wilson Ltd.".

Also, "and" is removed from "John and Wilson" in the Company Name field for data source 2. Also, the Address field for both data source 1 and 2 is put in a standardized format for addresses.

Also, fields may be matched using fuzzy matching techniques including, but not limited to, spelling distance; cosine similarity; string hashing; timestamp tests; distance metrics; and regular expression matching. For example, rows from the data sources 1 and 2 are matched according to the Name field and the Company Name field based on a fuzzy matching technique. The Name field and the Company Name field for example are entity fields for the data sources 1 and 2 respectively. Row 1 of each of the data sources 1 and 2 are a match based on the entity fields because "John Wilson" is in both fields as shown in FIG. 4B. Similarly, row 2 of each of the data sources 1 and 2 are a match based on the entity fields because "UNKNOWN" is in both fields as shown in FIG. 4B.

Matching rows may be linked based on an over-linking value. For example, links are discarded with statistically large connections utilizing a comparison to a number of distributions including but not limited to Normal, Poisson, Binomial and Univariate. For example, the distribution of matches on field values for the entity field is determined, and the top 5% of the distribution is discarded as being considered over-linking. "UNKNOWN" may be in the top 5%, and is not linked. However, "John Wilson" may be below the top 5%, and the rows with "John Wilson" in the entity field are linked. In this example, the top 5% is the over-linking value, and the over-linking value is satisfied in this example if the matching field value falls below the top 5%. In other examples, other thresholds may be used for the over-linking value, and a comparison to the over-linking value that indicates that the match is not an over-matched field value may cause the rows to be linked.

A field is included in the intermediate tables 110 that includes a unique ID for linked fields. For example, as shown in FIG. 4C, CompID is the field that includes a unique ID for linked fields. Rows that are linked have the same value in the CompID field. For example, "87897456" is the CompID field value assigned to the linked rows of data sources 1 and 2 as shown in FIG. 4C. The CompID field may be used to sort and retrieve all the rows from all the data sources that are for the same entity, and the data may be loaded into the target tables 111.

Although not shown in FIGS. 4A-C, the intermediate tables 110 include time fields to store the time data. The tables of the intermediate tables 110 include analytics record fact table, which include an entity field and a time field and a CompID field for each row, along with other fields, such as Address, Event Description, etc. The data analytics record fact tables may be sorted by CompID and loaded into the target tables 111 retaining the time field in the data.

Referring back to FIG. 3, at 303, variable transforms are used to determine virtual analytical records from the data for a selected point in time and for a selected entity. A virtual analytical record is comprised of a field or set of fields that are calculated from field values from the intermediate tables and may be for a particular entity and time period. In an example, the calculation is based on an aggregation of fields values for a particular entity. Operations other than aggregations may be performed to determine the virtual analytical records. The operations or calculations performed to determine the virtual analytical records are referred to as variable transforms. The variable transforms may be used to generate virtual analytical records that each provides an entity view using rolled-up data across various usable dimensions and across time, interaction types and information sources. The rollup may include an aggregation of a dimension or multiple dimensions (e.g., fields in the intermediate tables 110) over a particular time period for an entity. Rollups may be determined for multiple entities. This information may be used as models for analytics. User input may be provided to select the entities, dimensions, time period, and variable transforms to execute. Variable transformations may be executed for multiple different time periods and for multiple different dimensions for the same entity to generate views for the entity of the rolled-up data.

Figure 5:
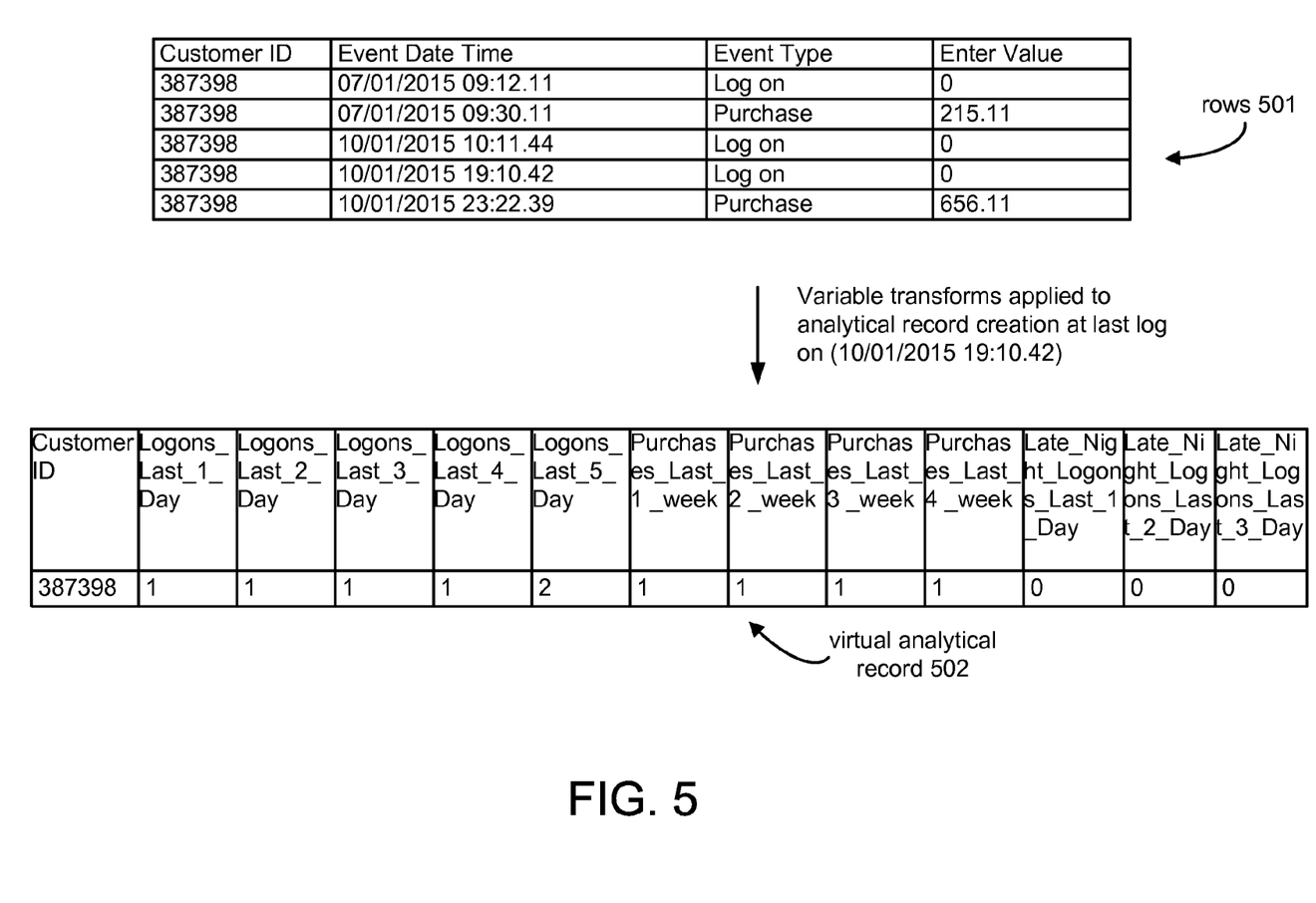
FIG. 5 shows examples of transformation operations, according to an embodiment.

FIG. 5 shows an example of applying variable transforms for rows in the intermediate tables 110 for a particular entity identified by the Customer ID=387398. Rows 501 are examples of rows for 387398. In this example, fields in the intermediate tables 110 for one or more data sources include Customer ID, Event Date Time, Event Type and Event Value.

Variable transforms are applied to the rows 501 for a time period. The time period may be specified by a user providing user input to the system 100. In the example shown in FIG. 5, the time period is the time prior to an including the last logon of Oct. 1, 2015 at 19:10:42. The variable transforms are aggregations for particular fields. For example, the variable transforms include aggregations for logons in the last day, last 2 days, last 3 days, last 4 days and last 5 days. The variable transforms include aggregations for purchases for the last 1 week, last 2 weeks, last 3 weeks and the last 4 weeks. The variable transforms include aggregations for late night logons for the last 1-3 days.

The variable transforms are able to aggregate for a particular entity across different data sources based on the matching and linking performed at 302. For example, data in the intermediate tables may be sorted in the CompID to identify rows across data sources for the same entity identified by a particular CompID. The variable transforms may be applied to these rows to determine virtual analytical records for the entity. The variable transforms may be applied for different entities.

Referring back to FIG. 3, at 304, predictive analytics are applied to predict values based on the virtual analytical records. The predictive analytics may include but are not limited to Deep Learning methods, Random Forests, Support Vector Machines, Neural Networks, Uplift Modelling, Net-Lift Modelling, Model-based Recursive Partitioning Trees and Forests, Conditional Treatment Models, Clustering Methods. In an example, the predicted values may be churn rates determined for virtual analytical records of multiple different customers. The predicted churn rates, which may represent a probability of the customer purchasing an item from a different online retailer, may be based on the aggregated values such as shown in FIG. 5. The predicted value may be included in the virtual analytical records and stored in the intermediate tables 110 with the virtual analytical records. The virtual analytical records, predicted values and the analytics record fact tables from the intermediate tables 110 are loaded into the target tables 111 at 305.

Once the data is loaded in the target tables 111 in the data warehouse 120, the data in the target tables 111 may be used for real-time decision making processes performed by external systems. In an example, a customer is currently on an online shopping website, and the data in the target tables 111 is queried to determine predictions for the customer and to select customized treatments and product recommendations for the customer.

Figure 6:
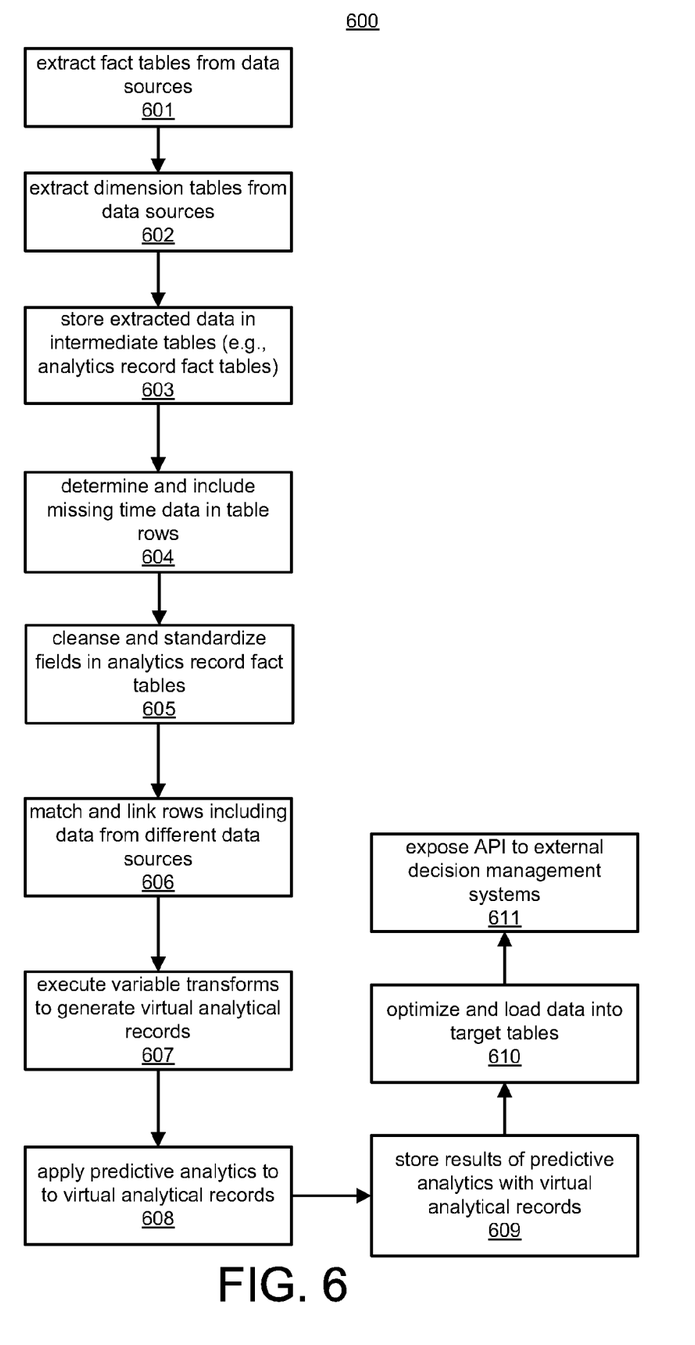
FIG. 6 illustrates a flow chart of a method including ETL operations, according to an embodiment.

FIG. 6 illustrates a flow chart of a method 600 for ETL operations, according to an embodiment. Steps of the method 600 include steps of the method 300 with additional details. At 601 and 602, data is extracted from the data sources 101. For example, fact tables and dimension tables are extracted at 601 and 602 from the data sources 101. A fact table is a central table that typically stores quantitative information for analysis, such as event information (e.g., user ID, date/time, event type, etc.) and is often denormalized. A dimension table stores data about the ways in which the data in the fact table can be analyzed. For example, a dimension table may include fields further describing the user, such as user ID, name, age, region, etc. The fact tables and dimension tables may be provided by different sources. The fact table may include two types of columns. Foreign keys columns allow joins with dimension tables, and measures columns contain the data that is being analyzed. In an example, the fact table and dimension table fields for each data source to extract may be determined according to a field data dictionary that indicates the fields to extract and characteristics of the fields. The field data dictionary may be stored in the system 100. The fact tables and dimension tables may be extracted from structured data, such as provided in databases, provided by the data sources 101. Unstructured data may also be extracted and stored in analytics record fact tables in the intermediate tables 110.

At 603, the extracted fact data and dimension table data are stored in the intermediate tables 110. For example, a new fact table is created that includes fields from the extracted fact tables and dimension tables, including entity and time fields. The new fact tables in the intermediate tables 110 may be referred to as analytics record fact tables. Also, treatment data from online experiments, which may be provided from entity data sources or imported from external applications may be included in the analytics record fact tables and incorporated into the entity timeline. The treatment data may include propensity scores that can be used to confirm that the treatment data does not contain confounding information.

At 604, a determination is made as to whether the rows from the analytics record fact tables include time data associated with another field in the row, and for each row missing the time data, the time data is determined and included in the row. For example, missing time data may be estimated or predicted based on event data and an available set of time data points for the entity. For example, if time is being estimated for a time a user resided at a particular address, and the event data from a fact table indicates that a number of time-stamped transactions occurred while the user resided at that residence, then the time the user resided at the address may be estimated from a transaction date or a range of transaction dates. In another example, a user may input the time data.

At 605, fields in the analytics record fact tables may be cleansed and standardized, such as described above with respect to 302 in the method 300 and FIGS. 4A-C. At 606, rows from different sources are matched and linked, such as described above with respect to 302 in the method 300 and FIGS. 4A-C. Linking may include preventing over-linking of matching rows according to an over-linking value. A unique ID, such as the CompID shown in FIG. 4C, is assigned to linked fields.

At 607, variable transforms are executed to determine virtual analytical records, such as described at 303. Variable transforms may be executed to create virtual analytical records from the data for a selected point in time and for a selected entity and for selected dimensions. At 608, predictive analytics are applied to predict values based on the virtual analytical records. The predictive analytics may include but are not limited to Deep Learning methods, Random Forests, Support Vector Machines, Neural Networks, Uplift Modelling, Net-Lift Modelling, Model-based Recursive Partitioning Trees and Forests, Conditional Treatment Models, Clustering Methods. At 609, results of the predictive analytics are stored with the virtual analytical records, and may be included in the intermediate tables 110.

At 610, the data in the intermediate tables 110 is optimized to the entities, such as for scoring, and is loaded into the target tables 111. In the target tables 111, the data may be stored in entity and timeline order on for example a traditional DBMS system, graph database, HADOOP platform or NOSQL data store. Data may be partitioned to improve query response times for retrieval of current snapshots of data. Prioritization may be given to more recent data and data required for the models in production at any one time. At 611, an API is exposed to external decision management systems to recreate the virtual single analytical record at the current snapshot and any associated models. The API is then used for decision-making performed by the external system. For example, a customer logging onto a website is given a personalized treatment based upon the combination of a model predicting their lifetime value to the company and a model predicting their sensitivity to a range of discount offers. Another example would be using a pricing model to give a real-time price for insurance to a customer shopping online. Other uses could be for marketing letters or phone calls, banner ads online or face-to-face sales.

The methods 300 and 600 are repeated for new data extracted from the data sources 101 and steps of the methods 300 and 600 may be repeated to execute different variable transforms and generate new virtual analytical records for analytics and for enhancing the data subsequently loaded in the target tables 111 for applications utilizing the data.

While the embodiments have been described with reference to examples, those skilled in the art will be able to make various modifications to the described embodiments without departing from the scope of the claimed embodiments.

What is claimed is:

1. A data storage, extract, transform and load (ETL) system comprising:
    a data storage device storing intermediate tables;
    a network interface connecting the system to at least one of a plurality of data sources to extract data; and
    at least one processor to:
        extract data from the plurality of data sources, wherein the extracted data includes entity and time data;
        load the extracted data in analytics record fact tables in the intermediate tables, wherein the analytics record fact tables include fields for the entity and time data and additional fields for other extracted data associated with the entity data;
        match and link rows of the analytics record fact tables for different data sources that are determined to be for the same entity;
        execute variable transforms on the linked rows for an entity and for a time period to generate virtual analytical records for the entity; and
        apply predictive analytics to the virtual analytical records for the entity to predict values for the entity; and
        load data from the analytics record fact tables and the virtual analytical records and the predicted values in target tables.

2. The data storage ETL system of claim 1, wherein the processor is to:
    identify rows of the analytics record fact tables missing time data; and
    determine and include time data in the identified rows.

3. The data storage ETL system of claim 1, wherein to determine and include time data in the identified rows, the processor is to determine an entity associated with each identified row, determine time data associated with events for the entity from the extracted data for the entity, and estimate the missing time data from the time data associated with the events for the entity.

4. The data storage ETL system of claim 1, wherein to match rows of the analytics record fact tables for different data sources, the processor is to at least one of cleanse, standardize and combine entity fields of the analytics record fact tables, wherein the matching is performed on the entity fields.

5. The data storage ETL system of claim 4, wherein to link rows of the analytics record fact tables for different data sources, the processor is to:
    determine an over-linking value; and
    link matching rows that satisfy the over-linking value, wherein to link the matching rows, the processor is to generate a unique ID for the matching rows associated with the same entity that satisfy the over-linking value and store the unique ID in the linked rows of the analytics record fact tables.

6. The data storage ETL system of claim 5, wherein the analytics record fact tables are sorted according to the unique ID of the linked rows, and the variable transforms are executed on the linked rows for the same entity that are determined from the sort.

7. The data storage ETL system of claim 1, wherein the processor stores treatment data from online experiments in the analytics record fact tables.

8. The data storage ETL system of claim 1, wherein the target tables are in an external data warehouse, and the data loaded into the target tables is organized by time and entity.

9. The data storage ETL system of claim 1, wherein data in the target tables is exposed via an application program interface to external systems to retrieve data from the target tables for applications.

10. The data storage ETL system of claim 1, wherein execution of at least one of the variable transforms generates an entity view including at least one dimension aggregated over the time period.

11. A method for extract, transform and load operations, the method comprising:
    extracting data from each data source of a plurality of data sources, wherein the extracting from each data source includes:
        extracting fact table fields from the data source;
        extracting dimension table fields from the data source;
    loading the extracted fact table fields and the dimension table fields into intermediate tables in at least one storage device;
    determining, by a processor, whether rows in at least one of the intermediate tables includes time data associated with at least one of the extracted dimension table fields;
    for each row missing time data, determining time data associated with at least one field in the row and including the time data in the row;
    determining rows from the intermediate tables of the plurality of data sources that are matching rows based on an entity field in each row;

linking the matching rows if the matched rows satisfy an over-linking value;

determining a historic data set from the intermediate tables based on a variable transform;

executing predictive analytics on the historic data set; and loading, into at least one target table in a data warehouse, the analytics record fact tables, the historic data set, and predictive analytics values determined from executing the predictive analytics, wherein the loaded data includes time the data and entity data for each row in the at least one target table.

12. The method of claim 11, wherein loading the extracted fact table fields and the dimension table fields into intermediate tables comprises:

generating, in the intermediate tables, an analytics record fact table for each data source, wherein each analytics record fact table includes the extracted fact table fields and the extracted dimension table fields, and wherein the fields of each analytics record fact table includes a time field storing the time data and the entity field.

13. The method of claim 12, wherein determining rows from the intermediate tables of the plurality of data sources that are matching rows comprises:

at least one of cleansing, standardizing and combining the entity fields of the analytics record fact tables, wherein the matching is performed on the entity fields.

14. The method of claim 13, wherein linking the matching rows if the matched rows satisfy an over-linking value comprises:

determining a number of matches for a particular entity in the entity fields of the analytics record fact tables;

comparing the number of matches for the particular entity to a threshold;

if the number of matches exceeds the threshold, not linking the matched rows for the particular entity; otherwise linking the matched rows.

15. The method of claim 14, comprising:

generating a unique ID for the linked rows associated with the same entity and storing the unique ID in the linked rows.

16. The method of claim 15, comprising:

sorting according to the unique ID of the linked rows, wherein the historic data set is determined from the sorted rows for the same entity.

17. The method of claim 11, wherein determining a historic data set from the intermediate tables based on a variable transform comprises:

determining a time period, an entity and a dimension for the entity stored in the intermediate tables; and aggregating values from the intermediate tables for the entity and the dimension that are within the time period to determine the historic data set.

18. The method of claim 11, wherein extracting data from each data source comprises:

determining fields and characteristics for the fields to extract from each data source according to a data dictionary.

19. A non-transitory computer readable medium storing machine readable instructions executable by at least one processor to:

extract data from each data source of a plurality of data sources loading the extracted data into intermediate tables in at least one storage device;

determine whether rows in at least one of the intermediate tables includes time data associated with at least one of the extracted dimension table fields;

for each row missing time data, determine time data associated with at least one field in the row and include the time data in the row;

determine rows from the intermediate tables of the plurality of data sources that are matching rows based on an entity field in each row;

link the matching rows if the matched rows satisfy an over-linking value;

determine a historic data set from the intermediate tables based on a variable transform;

execute predictive analytics on the historic data set; and load, into at least one target table in a data warehouse, the analytics record fact tables, the historic data set, and predictive analytics values determined from executing the predictive analytics, wherein the loaded data includes time the data and entity data for each row in the at least one target table.

20. The non-transitory computer readable medium of claim 19, wherein to load the extracted data into the intermediate tables, comprises:

generating, in the intermediate tables, an analytics record fact table for each data source, wherein each analytics record fact table includes extracted fact table fields and extracted dimension table fields, and wherein the fields of each analytics record fact table includes a time field storing the time data and the entity field.

* * * * *